July 7, 1936.  H. F. PHILLIPS  2,046,837
MEANS FOR UNITING A SCREW WITH A DRIVER
Filed July 3, 1934  2 Sheets-Sheet 1
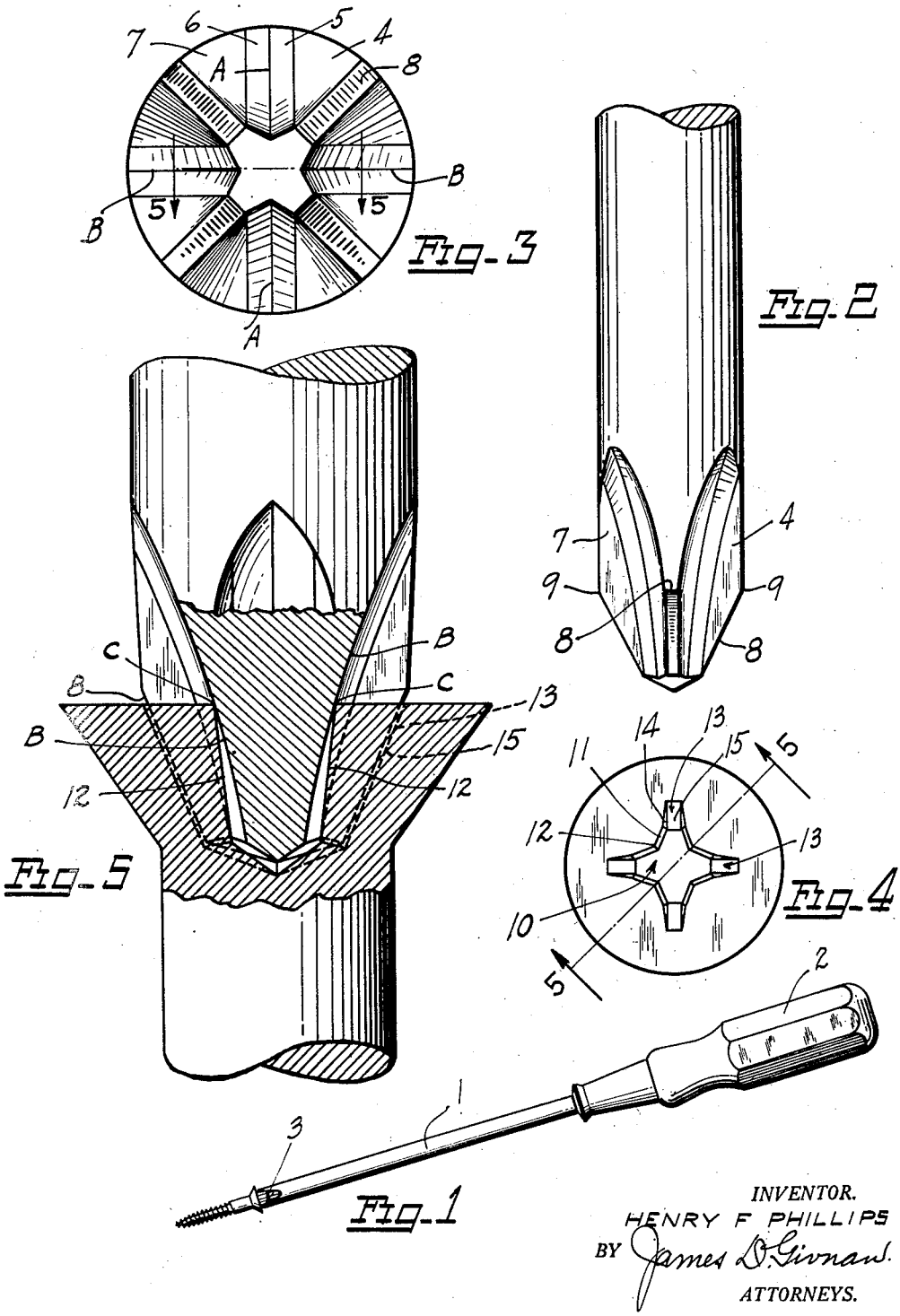
INVENTOR.
HENRY F PHILLIPS
BY James D. Givnan
ATTORNEYS.

July 7, 1936.  H. F. PHILLIPS  2,046,837
MEANS FOR UNITING A SCREW WITH A DRIVER
Filed July 3, 1934  2 Sheets-Sheet 2

HENRY F. PHILLIPS.
INVENTOR.
BY James D. Givnan
ATTORNEYS.

Patented July 7, 1936

2,046,837

UNITED STATES PATENT OFFICE 2,046,837

MEANS FOR UNITING A SCREW WITH A DRIVER

Henry F. Phillips, Portland, Oreg., assignor, by mesne assignments, to Phillips Screw Company, Wilmington, Del., a corporation of Delaware Application July 3, 1934, Serial No. 733,621

3 Claims. (Cl. 145—50)

This invention is directed to a composite structure of a screw and a tool or driver therefor, and more particularly to the provision of co-operative means in each of said elements, which, when brought together in the ordinary manner of presenting a screw driver to a screw, will cause the two to become securely united.

The present invention relates more particularly to improvements in the type of screw and screw driver shown and described in the following allowed United States patent applications:

Screws, Serial Number 670,118, filed May 9, 1933, allowed April 21, 1934, in the names of Henry F. Phillips and Thomas M. Fitzpatrick.

Screw drivers, Serial Number 670,117, filed May 9, 1933, allowed April 24, 1934, in the names of Henry F. Phillips and Thomas M. Fitzpatrick.

The present invention comprises a screw of any of the well-known conventional types, such as flat head, round head, filister head, oval filister head, and the like. The head of the screw, regardless of its shape or size, is formed with a tool-receiving recess of an especially designed configuration substantially the same as that shown and described in the aforesaid allowed patent application. This recess is formed within precision limits of manufacture to co-operatively receive a tool formed at one of its ends with a bit formed somewhat similar to that shown and described in the aforesaid allowed screw driver patent application. The tool is also precisely constructed at one of its ends into a bit formed with certain angular faces arranged in definite relation to certain angular portions of the recess to cause a firm wedging engagement between the bit and the recess when the two are brought together. The results of such a union are obviously highly advantageous in presenting screws to be driven, either by hand or by power-driven types of tool, to work to be dealt with, especially in places difficult to approach, that is to say, in places where neither hand of the operator can be placed. In applying screws of the slotted type to work in any location, both hands of the operator must be applied, one to guide the screw, and then to stabilize the screw during its advancement, and then to further stabilize the driver in a central position with respect to the screw.

The screw and driver shown and described in the aforesaid allowed patent applications, comprise a tool-receiving recess formed in the screw head and a tool formed at its working end with a bit made to fit precisely the recess in the screw. In other words, the precision limits of manufacture of the recess are identical with those of the correspondingly shaped end of the driver, so that a perfect fit between the two without binding or wedging is accomplished.

In contrast to these structural characteristics, of identical form, the elements constituting my present form of composite invention are constructed along complementary angular lines to effect a positive wedging engagement when the screw and driver are joined together in operative relation, instead of the driver merely occupying the space defined by the recess as is the case in the aforesaid separate screw and driver inventions.

Such failure of the slotted screw to retain the blade-driver, especially in power driven operations, is not only dangerous to the operator, but is likewise, always injurious to the work, especially in the construction of furniture and other types of work wherein the elements to which the screws are being applied become badly mutilated when the power driver leaves the slot, usually during high speed operation of the driver which is most difficult to stop in time to prevent injury to the work.

Accordingly, therefore, the principal object of my invention is to overcome all of the foregoing objectionable features in the operation of a screw by a driver, by providing a composite structure as aforesaid, wherein a screw may be first secured to the end of a driver, and presented to the work to be dealt with without the inconvenience of the screw dropping from the end of the driver. The screw is also centralized with respect to the driver, not only during its starting operation but also throughout its entire advancement, and during such advancement, the driver is locked in its proper centralized working relation with the screw, and any danger of its leaving the screw is thus entirely eliminated. Another object of the invention is the particular angular formation of the walls of the recess in the screw with respect to the angular formation of the working end or bit of the driver to establish a wedging engagement between the two when united. This same angular formation of both elements is especially designed to also create what might be termed a camming action during the approach of these angular faces toward one another with respect to any substances which might have become lodged within the recess of the screw. It has been found by experiment that a downward thrust of the bit into the recess will instantly dislodge any substance within the recess by causing it to move upwardly and outwardly over the walls of the recess.

Still another object of the invention is the provision of angular faces in such relation to each other that the wedging engagement may be obtained by the mere gravitation of the driver and the operator's hand applied to it. The angular faces, in other words, are so related to each other that even a slight downward thrust of the driver into the recess will cause a firm wedged engagement between the two elements.

Another feature of the invention is that the same gripping relation, as aforesaid, may be accomplished in screws which are provided with recesses having any number of grooves, whether diametrically opposed or not, to receive in wedged engagement, drivers with a corresponding number of vanes. I also wish to point out that my invention provides means in the grooves which are diametrically opposed, to receive the ordinary flat blade-driver such as is now commonly known and used. These blade-drivers may or may not be tapered at their lowermost ends for operative engagement with said grooves. This particular feature enhances the utility of the screw by reason of the fact that any blade-driver may also be used to actuate the screw.

A still further object of the invention accomplished by this specific angular relation between the driver and the screw is that only two sizes of my improved form of driver are needed to fit all types of screws in sizes ranging from number 5 to 16 inclusive, instead of six or more sizes of the slotted drivers required to fit the same range of sizes of slotted screws.

Moreover, by reason of the perfect fit between the driver and the screw, the screws may be driven and removed innumerable times without the slightest indication of mutilation to the head. This highly desirable feature is made possible by the firm contact of all the angular faces of the driver into the corresponding angular faces of the recess formed at many different equidistant points around the longitudinal center line of both the screw and the driver. Thus, is provided many times as much gripping area as is provided in the slotted screw. This obviously, gives greatly increased strength and torsion with the result that my screws can be driven into material which slotted-head screws could not be made to penetrate.

These and other objects will appear as my invention is more fully hereinafter described in the following specification, illustrated in the accompanying drawings, and finally pointed out in the appended claims, and as said invention broadly comprehends any screw and driver constructed to unite in wedged relation, it is apparent that I am not to be confined to any specific form or mere construction of device, inasmuch as a variety of modified mechanical structures may be adopted in embodying my said invention.

In the drawings:

Figure 1 is an assembly view of a screw firmly united with a driver in accordance with my invention and adapted to be presented to work to be dealt with from any angle of approach without danger of the screw falling from the driver.

Figure 2 is an enlarged side elevation of the lowermost end of the driver.

Figure 3 is an enlarged end elevation of Figure 2.

Figure 4 is an enlarged top plan view of my new and improved form of screw.

Figure 5 is an enlarged fragmentary sectional side elevation of the combined screw and driver in operative engagement with each other. This view is taken on lines 5—5 of both Figures 3 and 4.

Figure 8:
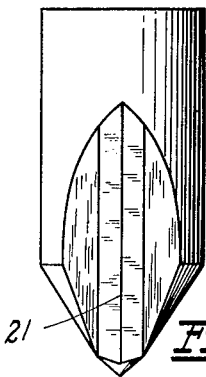
Figure 8 is a side elevation of the lowermost end of a driver formed with only two oppositely disposed flutes for engagement with the type of screw shown in Figure 6.
Figure 11:
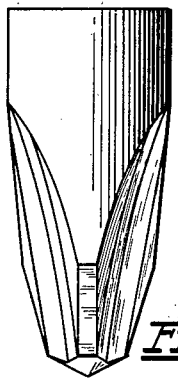
Figure 11 is a side elevation of the lowermost end of a modified form of driver provided with three flutes merging into three vanes for operative engagement with the type of screw shown in Figure 9.
Figure 14:
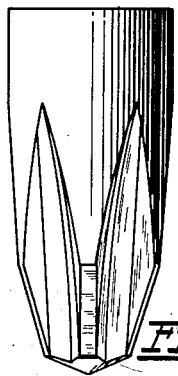
Figure 14 is a side elevation of the lowermost end of a still further modified form of driver provided with five vanes for operative engagement with the type of screw shown in Figure 12.
Figure 7:
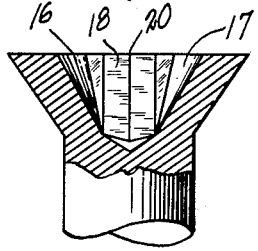
Figure 7 is a sectional side elevation taken on the line 7—7 of Figure 6.
Figure 10:
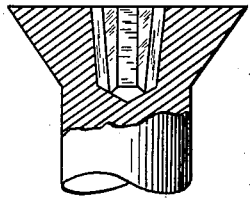
Figure 10 is a sectional side elevation of Figure 9 taken on the line 10—10 of Figure 9.
Figure 13:
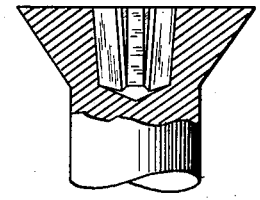
Figure 13 is a sectional side elevation taken on the line 13—13 of Figure 12.

Referring now more particularly to the drawings:

The actuating tool or driver consists of a shank 1, provided with any suitable gripping means indicated at 2, at one of its ends. This gripping means may be either in the form shown or that of a reduced portion on the shank to form an engaging means with a power driver. The end of the shank opposite to that of the gripping means is formed with a plurality of flutes 3, substantially concave in the direction of their length and likewise concave in the direction of their width. The transverse formation of each flute, as shown in Figure 3, is made up of converging angular panels 4, 5, 6, and 7. The panels 4 and 7, forming the side walls of each of the adjoining flutes, converge into lands or vanes 8, as best shown in Figure 2. The intermediate angular panel portions 5 and 6, are partly concave and partly tapered in the direction of their length, as best shown in Figure 5. For the purpose of further and more convenient description of the invention, it will be noted in Figure 3, that the lines of convergence of the angular panel portions 5 and 6, in each flute are arranged on imaginary intersecting transverse center lines of the shank. In Figure 3, these imaginary center lines are indicated by the letters A and B. These lines of convergence of the said center panels 5 and 6, form four diametrically opposed and equidistantly spaced lines of contact to be hereinafter more fully described.

With reference to Figure 2, it will be noted that the vanes 8, are formed with substantially parallel walls extending downwardly and tapering from points indicated at 9, on the shank to equidistantly spaced points around the longitudinal center line of the shank. The terminal end of the shank beyond these points of convergence may be of any suitable blunt shape.

My new and improved form of screw especially designed and adapted for co-operative use with the driver is best illustrated in plan view in Figure 4, wherein it will be seen that the head of the screw is formed with a generally inwardly tapering punched incision or recess generally indicated at 10. The side walls of the recess are made up of angularly related and tapered panels 11, which are angularly disposed to lines of convergence indicated at 12. These lines of convergence, it will be noted, are arranged on imaginary intersecting center lines of the screw in precise conformity to the lines A and B, as previously described in connection with Figure 3, but, it will be noted in Figure 5, that the taper of these lines 12, in the screw are of a lesser angle than those of the corresponding lines A and B of the driver, and it is imperative that these two series of lines converge along two different degrees of angularity so that the most efficient wedging engagement between the bit and the recess in the screw may be accomplished. The side walls 11, of the recess merge at their ends, opposite to those converging to the lines 12, into diametrically opposed grooves 13, which are formed with angular and inclined side walls 14 and an inclined bottom wall 15, and conform substantially to the configuration of the vanes 8, on the driver. In other words, the construction of the punch used for forming the recess in the screw is similar to that of the driver.

With further reference to Figure 5, it will be noted that the bit is firmly engaged with the recess in the screw at points indicated at C, and it will be further noted that in such engagement, the outside walls of the vanes 8, are slightly out of contact with the bottom walls 15, of the grooves 13, and likewise, the lowermost end of the bit is out of contact with the bottom of the recess. In other words, space is provided around all points of the bit for further advancement thereof into the recess to accomplish an even greater degree of wedged engagement between the bit and the recess. Moreover, this slightly spaced relation permits of a camming out or crowding out of any substances which might become lodged in the recess without disturbing the predetermined relation of the driver and screw. The downward thrust of the converging angular faces of the bit toward the diverging faces of the recess will cause the substances within the recess to be crowded upwardly and outwardly over the inclined walls of the recess.

Figure 6:
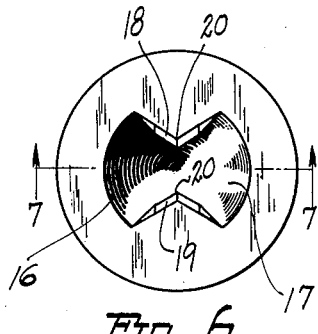
Figure 6 is a top plan view of a modified form of the invention wherein the screw is formed with only two tool-receiving cavities between which tapering and angularly disposed side walls of the recess are provided for engagement with the driver.
Figure 9:
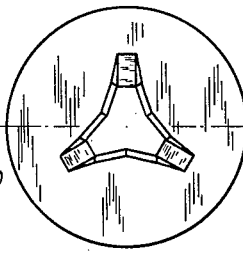
Figure 9 is a top plan view of another modified form of invention wherein the recess is formed with three tool-receiving grooves.
Figure 12:
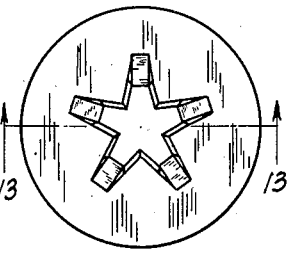
Figure 12 is a top plan view of a still further modified form of screw wherein the recess is formed with five tool-receiving grooves.

With reference to the modified form of invention shown in Figure 6, it will be noted that the recess, instead of being provided with tool-receiving grooves as defined in connection with the type of screw shown in Figures 1 to 5 inclusive, is provided with two converging semi-circular cavities 16 and 17, between which are formed inwardly projecting and opposed tapering walls 18 and 19, which merge at their outermost edges with the ends of the cavities 16 and 17. These walls converge to diametrically opposed center lines 20.

The driver shown in Figure 8, is especially designed to co-operate in wedged engagement with the cavity in the screw shown in Figure 6 by being formed with two diametrically opposed flutes whose side walls are convex in the direction of their length and substantially concave in transverse cross section. These walls converge transversely to lines 21 which correspond in location with the lines 20, defined in connection with Figure 6, but are formed on an angle of lesser degree than that of the lines 20, so that the wedging engagement between the two may be accomplished.

The description of the operation of the preferred form of invention shown in Figures 1 to 5 inclusive, may also be applied to the operation of the modified forms of invention shown in Figures 9 to 14 inclusive. These modified forms, as previously stated, show drivers with an odd number of vanes, and recesses in the screws formed with a like number of grooves. The angular relation of the walls of the recess with respect to the angularity or concavity of the flutes is the same as has been heretofore described in connection with the preferred form of the invention, and a definite wedging engagement between the modified forms of screws and their respective drivers is accomplished.

While I have shown a particular form of embodiment of my invention, I am aware that many minor changes therein will readily suggest themselves to others skilled in the art without departing from the spirit and scope of my invention.

Having thus described the invention, what I claim as new and desire to protect by Letters Patent, is:—

1. In combination, a screw having a generally inwardly tapering recess extending into its upper face along its longitudinal axis, the side walls of said recess comprising alternate ribs and flutes, and a driving tool, said tool having its bit end generally tapering more sharply than said recess and being constructed with alternate ribs, and flutes, which are received in operative position in the flutes, and ribs, respectively, of said recess, the difference in taper of said recess and bit end making said recess and bit end sufficiently unlike in horizontal cross section that rib portions of one part are wedgingly engaged with cooperating flute portions of the other part by a relative rectilinear movement of said bit end into said recess, whereby said screw is temporarily held on said driver by the friction between said cooperating wedged portions.

2. In combination, a screw having a generally inwardly tapering recess extending into its upper face along its longitudinal axis, the side walls of said recess comprising alternate ribs and flutes, and a driving tool, said tool having its bit end generally tapering differently from said recess and being constructed with alternate ribs and flutes, which are received in operative position in the flutes and ribs, respectively, of said recess, the difference in taper of said recess and bit end making said recess and bit end sufficiently unlike in horizontal cross section that rib portions of one part are wedgingly engaged with cooperating flute portions of the other part by a relative rectilinear movement of said bit end into said recess, whereby said screw is temporarily held on said driver by the friction between said cooperating wedged portions.

3. In combination, a screw having a recess extending into its upper face along its longitudinal axis, the side walls of said recess comprising alternate ribs and flutes, and a driving tool, said tool having its bit end generally tapering with respect to the walls of said recess and being constructed with alternate ribs and flutes, which are received in operative position in the flutes and ribs, respectively, of said recess, the taper of said bit end making said recess and bit end sufficiently unlike in horizontal cross section that the tapering portions of said bit end are wedgingly engaged cooperatively with the uppermost edges of the walls of the recess by a relative rectilinear movement of said bit end into said recess, whereby said screw is temporarily held on said driver by the friction between said cooperating portions.

HENRY F. PHILLIPS.